United States Patent
Cannon et al.

(10) Patent No.: US 6,766,002 B1
(45) Date of Patent: Jul. 20, 2004

(54) ADAPTIVE CALLER ID STORAGE BASED ON BLOCKED STATUS

(75) Inventors: Joseph M. Cannon, Harleysville, PA (US); James A. Johanson, Macungie, PA (US); Philip D. Mooney, North Wales, PA (US)

(73) Assignee: Agere Systems, Inc., Allentown, PA (US)

( * ) Notice: Subject to any disclaimer, the term of this patent is extended or adjusted under 35 U.S.C. 154(b) by 0 days.

(21) Appl. No.: 09/434,359

(22) Filed: Nov. 5, 1999

(51) Int. Cl.[7] .......................... H04M 1/56; H04M 15/06
(52) U.S. Cl. ......................... 379/142.01; 379/142.02; 379/142.09; 379/142.17; 379/93.23
(58) Field of Search .......................... 379/142, 201, 379/157, 93.23, 93.17, 142.01, 142.02, 142.04, 142.06, 142.09, 142.13, 142.17, 201.02, 201.1, 201.11; 455/414, 415

(56) References Cited

U.S. PATENT DOCUMENTS

| | | | | |
|---|---|---|---|---|
| 5,398,279 A | * | 3/1995 | Frain ........................... | 379/142 |
| 5,737,394 A | * | 4/1998 | Anderson et al. ......... | 379/88.11 |
| 5,781,613 A | * | 7/1998 | Knuth et al. .................. | 679/67 |
| 5,822,402 A | * | 10/1998 | Marszalek .................. | 379/67.1 |
| 5,875,239 A | * | 2/1999 | Koralewski et al. ........ | 379/142 |
| 5,898,506 A | * | 4/1999 | Itoh ........................... | 358/434 |
| 6,009,158 A | * | 12/1999 | Romero ...................... | 379/209 |
| 6,026,152 A | * | 2/2000 | Cannon et al. ......... | 379/142.06 |
| 6,067,355 A | * | 5/2000 | Lim et al. .................. | 379/142 |
| 6,081,583 A | * | 6/2000 | Cheng et al. ............. | 379/88.2 |
| 6,118,859 A | * | 9/2000 | Giethoorn .................... | 379/142 |
| 6,134,308 A | * | 10/2000 | Fallon et al. ............... | 379/142 |
| 6,137,871 A | * | 10/2000 | Maier et al. ................ | 379/142 |
| 6,198,812 B1 | * | 3/2001 | Weber .................... | 379/142.04 |
| 6,205,213 B1 | * | 3/2001 | Kucmerowski et al. ...................... | 379/142.01 |
| 6,208,713 B1 | * | 3/2001 | Rahrer et al. .............. | 379/67.1 |
| 6,282,275 B1 | * | 8/2001 | Gurbani et al. ........ | 379/142.06 |

* cited by examiner

*Primary Examiner*—Quoc D. Tran

(57) ABSTRACT

A telephone or adjunct Caller ID device adaptively stores Caller ID data based, for example, on a blocked status of the Caller ID data. In a particular example, a telephone or Caller ID device includes a memory adapted to store Caller ID data associated with an incoming call, and a processor adapted to affect storage of the Caller ID data based on an attribute of the Caller ID data, such as a blocked status of the Caller ID data. In an alternative embodiment, a method of receiving an incoming telephone call includes the steps of receiving Caller ID data associated with the incoming telephone call, evaluating a portion of the Caller ID data, and making a storage decision based on the evaluation. The decision may be based on a blocked status of the Caller ID data. The decision may be made proximate in time to the reception of the incoming telephone call, or in response to a user input to affect Caller ID already stored. For example, the decision may be made in conjunction with other storage decisions regarding other Caller ID data in response to the same user input, such as the activation of a keypad.

14 Claims, 3 Drawing Sheets

115'

CHRIS COLUMBUS    } 202
212-555-1492      } 204
206 { 08:37       09/07/02 } 208

115"

UNLISTED
000-000-0000
08:46             09/07/02

ADAPTIVE CALLER ID STORAGE BASED ON BLOCKED STATUS

FIELD OF THE INVENTION

The invention is directed to the field of telephony, and in particular to the area of Calling Number Identity (Caller ID) and the storage of and management of stored Caller ID data.

BACKGROUND OF THE INVENTION

Caller ID is a feature whereby data is associated with an incoming telephone call to provide the called party some information regarding the calling party, in particular, information regarding the calling party's telephone. The called party typically has an adjunct box, or a "feature-phone" with the adjunct box functionality incorporated therein, with a liquid crystal display that provides the called party with the information as the incoming call is being received. In the United States, the Caller ID information is typically provided between the first ring signal and the second ring signal, as described in Bellcore standard GR-30-CORE, incorporated herein by reference.

Alternatively, if the called party is engaged in a first telephone call while a second telephone call is being received, the called party may receive Caller ID with Call Waiting (CID/CW, or Type II Caller ID) information during a muting period as governed by Bellcore standard GR-30-CORE, incorporated herein by reference, or alternatively according to the procedure defined in U.S. Pat. No. 5,943,407, incorporated herein by reference. Similar standards, albeit not necessarily identical to the U.S. standards, are applicable in other countries.

An attribute of Caller ID is that it enables a called party to screen incoming calls by determining, based on the information presented, whether the called party wants to take time to engage in a conversation with the incoming caller, or to have the call go unanswered or forwarded to an answering machine. An additional advantage is that the called party can benefit from a record of the stored Caller ID data to use as a simple look-up device when returning a call to the incoming caller.

For example, the called party can scroll through the Caller ID data accumulated for a plurality of incoming calls by activating one or more keys of a telephone keypad while observing information presented on the Caller ID display. When the information that the called party is looking for appears on the display, the called party can now place a return telephone call by dialing the displayed number (by activating the corresponding keys), or in some telephones may simply press a key associated with the Caller ID display to automatically cause the displayed telephone number to be called.

The opportunity to scroll through the stored telephone numbers as part of placing an outgoing call may be habit-forming, especially for a user of a Caller ID device that enables an outgoing call to be automatically initiated upon the activation of a single key when the target telephone number is displayed. One proposed improvement to the existing technology is to make it accessible remotely, such that a user may call in to the user's telephone to review stored Caller ID data associated with one or more incoming calls, and to subsequently initiate an outgoing call to a particular party. Such an improvement tends to increase the reliance of the user on the Caller ID device.

A problem with the reliance on the stored Caller ID data as a part of the process of placing an outgoing call is that the memory holding the Caller ID data is limited. It can thus be frustrating to a user if the user is attempting to place an outgoing call, such as a return call, to a party that has previously called the user, but the user cannot place the call in the way the user has grown accustomed to because the target party's Caller ID information is not stored in the memory due to memory capacity limitations. There is therefore a need for an intelligent approach to managing a Caller ID memory to increase the utility of the Caller ID feature.

SUMMARY OF THE INVENTION

This need is met by a telephone or adjunct Caller ID device that adaptively stores Caller ID data based, for example, on a blocked status of the Caller ID data. In a particular example, a telephone or Caller ID device includes a memory adapted to store Caller ID data associated with an incoming call, and a processor adapted to affect storage of the Caller ID data based on an attribute of the Caller ID data, such as a blocked status of the Caller ID data.

In an alternative embodiment, a method of receiving an incoming telephone call includes the steps of receiving Caller ID data associated with the incoming telephone call, evaluating a portion of the Caller ID data, and making a storage decision based on the evaluation. The decision may be based on a blocked status of the Caller ID data. The decision may be made proximate in time to the reception of the incoming telephone call, or in response to a user input to affect Caller ID already stored. For example, the decision may be made in conjunction with other storage decisions regarding other Caller ID data in response to the same user input, such as the activation of a keypad.

BRIEF DESCRIPTION OF THE DRAWING

Objects and advantages of the invention will be apparent to one of skill in the art upon review of the following detailed description in light of the drawing, wherein.

DETAILED DESCRIPTION

Figures 1, 2, 3:
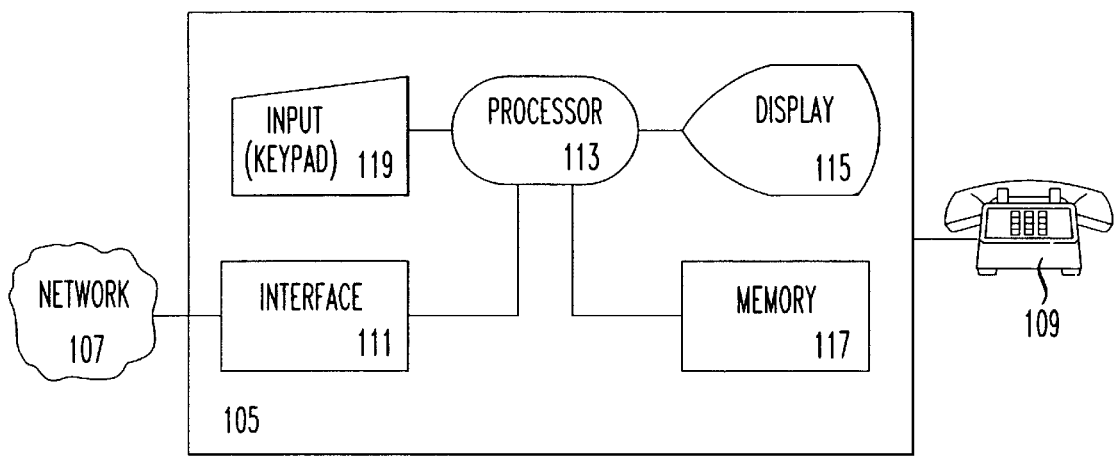
FIG. 1 is a simplified block diagram of a Caller ID adjunct box adapted to operate according to the invention.
FIG. 2 is a diagram of an exemplary image appearing on a display of the Caller ID device of FIG. 1.
FIG. 3 is a diagram of an alternative exemplary image appearing on the display of the Caller ID device of FIG. 1.

FIG. 1 is a simplified block diagram of a Caller ID device 105 incorporated, for example, into an adjunct box, and coupled to a network 107 and a telephone 109. The Caller ID device 105 includes an interface 111 to the network 107. For example, the interface 111 may be a telephone line interface (TLI) for an exemplary embodiment wherein the network 107 is a public switched telephone network (PSTN).

The Caller ID device 105 also includes a processor 113, such as a digital signal processor (DSP) or microcontroller, a display 115, such as a liquid crystal display (LCD), a memory 117, and an input unit 119, such as a keypad. At the block diagram level shown in FIG. 1, Caller ID device 105 may appear similar to a conventional adjunct box based Caller ID device. However, according to the invention, the operations of processor 113, display 115 and/or memory 117 are improved to increase the utility of the Caller ID feature. In particular, they are improved to make better use of the memory 117 and/or to make the display 115 more user friendly.

In one embodiment according to the invention, the processor 113 is adapted to determine if certain portions of incoming Caller ID data, such as the name and/or telephone number associated with the incoming caller's telephone, are not provided because, for example, they are blocked. Upon such a determination, the processor 113 is adapted to take a particular action that differs from that taken by a conventional Caller ID device. For example, the processor 113 may be adapted to elect not to make any record in memory 117 of such a call.

FIG. 2 provides an exemplary image of the contents of display 115, identified as 115', when an incoming call is being received, or when the record of the incoming call is being retrieved by a user, such as by activating one or more keys of the keypad 119. In this particular example, the display 115' contains a first field 202 that is adapted to display a name of a party associated with the incoming caller's telephone. This may in fact be the name of the incoming caller, or may alternatively be merely the name of the person associated with the telephone, as someone else, such as a friend or family member, is actually placing the call.

A second field 204 includes the telephone number of the calling telephone. A third field 206 displays the time that the incoming call is being received, if the display is provided in real time as the call is arriving, or the time that the call was received if the display is provided in response to user input as part of a process of reviewing the contents of memory 117. Similarly, a fourth field 208 displays the date associated with the arriving or stored incoming call. Additional fields may also be incorporated into the image of display 115'.

FIG. 3 provides display 115", which shows an alternative image for a situation is which the telephone used to make the incoming call has a blocking feature in place. In this example, the first field 202 does not include a name, but instead includes a word or phrase to indicate that the telephone placing the incoming call has blocking in place. For example, in FIG. 3 the word "UNLISTED" appears in the first field 202. Alternative words or phrases may be, for example, "NO DATA", "BLOCKED", "NOT LISTED", "UNKNOWN" or "INFORMATION UNAVAILABLE". Similar words may appear in the second field 204, or the second field 204 may be blank or may show a phantom telephone number, such as, for example 000-000-0000.

According to some embodiments, such as described in Bellcore standard TRNWT-001188, the above words or phrases are not sent to the Caller ID adjunct box 105 by a central office of the network 107. Instead, the central office transmits a message known as the Reason for Absence of Dialable Number, including a parameter of "P" or "O", where "P" means the Caller ID data are private, and "O" indicates that the Caller ID data are unavailable or the calling party is out of the area.

In a conventional Caller ID device, the information on display 115" is provided to the user as an image while the incoming call is being received, is stored in the memory, and is subsequently displayed to the user when the user is recalling or scanning through the stored Caller ID information. This is problematic as it unnecessarily uses memory space and annoys the user by forcing the user to scan through potentially meaningless data. This problem can be especially disconcerting if a large number of incoming telephone calls are blocked or are otherwise not accompanied by meaningful Caller ID data.

Figure 4:
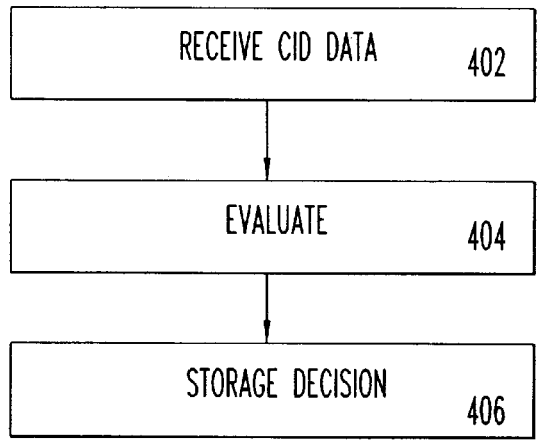
FIG. 4 is a simplified operational flowchart of an exemplary process according to the invention.

FIG. 4 provides a simplified operational flowchart for one embodiment according to the invention. At step 402, Caller ID data is received as part of the reception of an incoming telephone call. At step 404, the processor 113 evaluates the Caller ID data to determine if the incoming telephone call is accompanied by meaningful Caller ID data. For example, the processor at step 404 may determine if the first field 202 includes one of the words or phrases associated with a blocked telephone call. At step 406 a storage decision is made.

The storage decision may be, for example, to not store any information associated with the incoming call based on the blocked nature of the incoming call. Alternatively, the storage decision may be to store only some of the information in a partial record in memory 117, or to store all of the information as a record in memory 117, but to flag the record so that the information may be handled in a particular way upon a readout operation. Thus, depending on the system priorities, memory space may be utilized more efficiently and/or the user will find the information provided to be more valuable.

Figure 5:
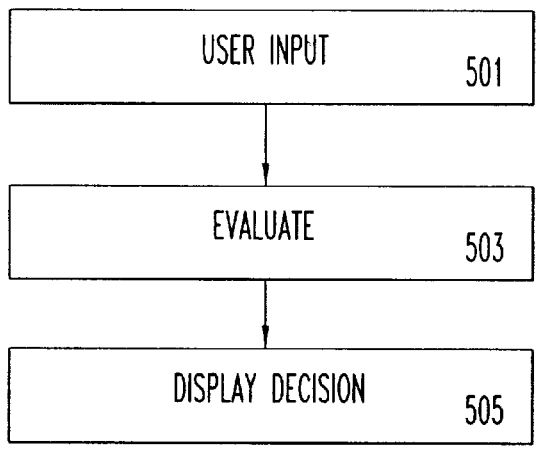
FIG. 5 is another simplified operational flowchart of another exemplary process according to the invention.

An alternative method of operation according to the invention is provided in the flowchart of FIG. 5, wherein the processor 113 may act in a conventional manner when storing the information in memory 117, but is adapted to act in a more useful way when instructed to read information out of memory 117 for presentation on display 115. In this particular example, at step 501 the user provides input, such as via the keypad 119, to inform the processor 113 that the user wants to review one or more records of Caller ID data.

The particular input may be conventional, such as pressing one or more keys on keypad 119 in a customary manner. However, the reaction to the input is different, in that there is an evaluation of the requested data at step 503, and a display decision at step 505. Thus, for example, the evaluation decision 503 may determine that a particular retrieved record contains blocked Caller ID data, and the display decision 505 may thus be to not display the record, to only display a portion of the record, to provide the user with alternative information, such as a count of the number of blocked records being retrieved, or any combination of these. If the system is configured according to this embodiment, the user will be spared the hassle of wading through a plurality of meaningless or low information content images while attempting to find a meaningful one.

The aforementioned embodiments describe the intelligent management of blocked Caller ID messages by taking unique action at the time the messages are stored, at the time messages are retrieved, or a combination of both. In an alternative embodiment depicted in FIG. 6, an intermediate point in time may be preferred. For example, it may be preferable to automatically perform the evaluation of the Caller ID data as described with respect to the embodiment of FIG. 3, but it may also be preferred that this evaluation not occur at the same time that the Caller ID data is being received and stored. Thus, for example, the Caller ID data may be stored in the normal manner, as part of the receipt of an incoming telephone call. Then, at step 602, presumably at a subsequent point in time, such as when telephone 109 is in an on-hook condition, one or more records are retrieved and evaluated. At step 604 a storage decision is made, and at step 606 the memory 117 is updated to reflect the storage decision.

Figure 6:
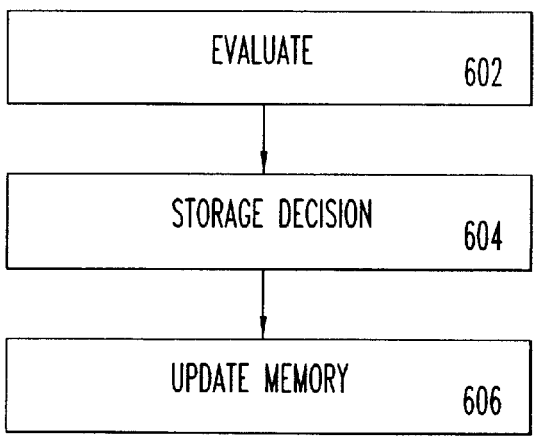
FIG. 6 is yet another simplified operational flowchart of yet another exemplary process according to the invention.
Figure 7:
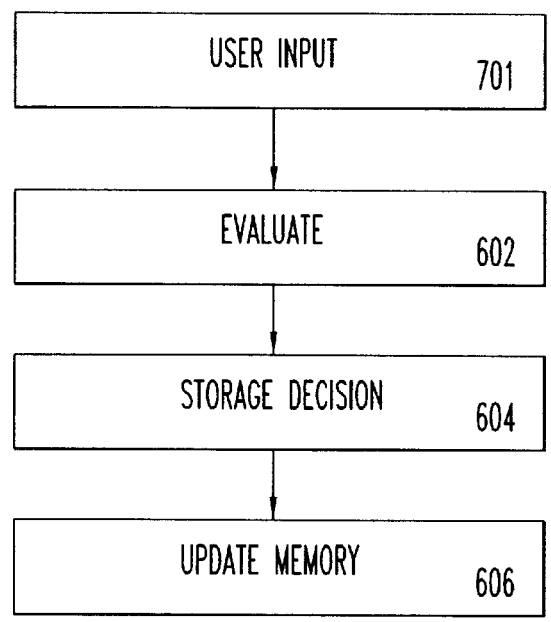
FIG. 7 is still another simplified operational flowchart of an exemplary process according to the invention.

The steps described with respect to the embodiment of FIG. 6 may occur automatically, such as on a periodic basis, such as once per day, week, month, etc., or may occur after the completion of each incoming telephone call and the corresponding storage of the record associated therewith. Alternatively, as depicted in the simplified flowchart of FIG. 7, the process may occur based on user input, such as, for example, user activation of one or more particular keys of keypad 119. For example, the user may provide input to "delete all blocked messages," at which point the steps 602–606 will be carried out to evaluate the stored records and update the memory.

Figure 8:
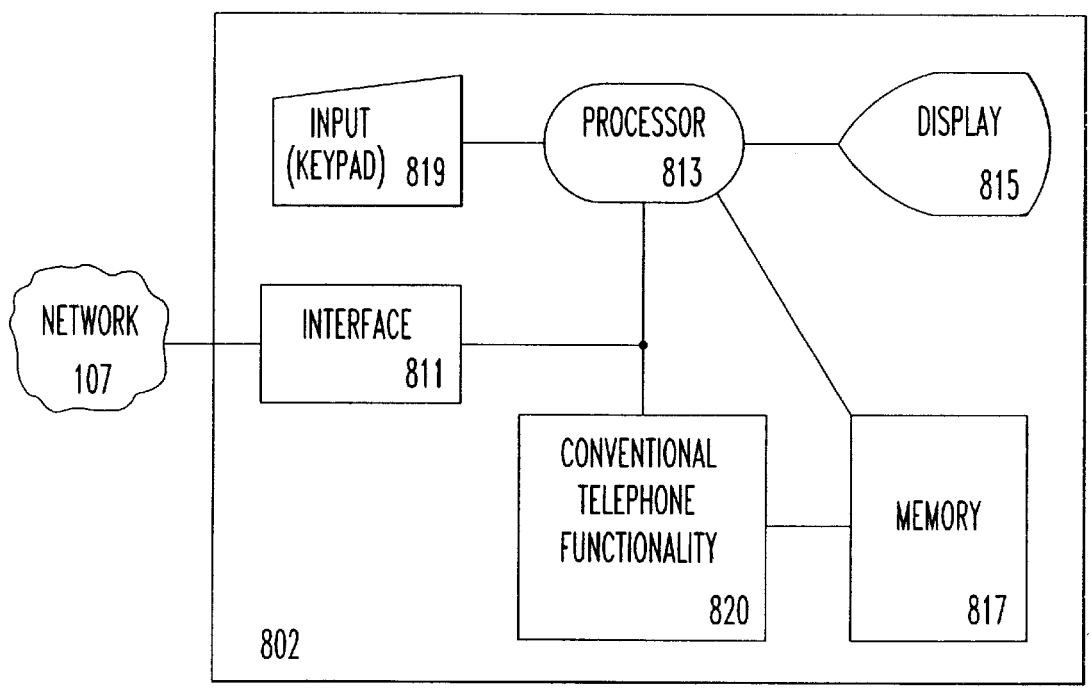
FIG. 8 is a simplified block diagram of a telephone incorporating the elements of a Caller ID device according to the invention.

The aforementioned embodiments are described with respect to an adjunct box 105 of FIG. 1. Alternatively, the functionality of the Caller ID device may be incorporated into a telephone, such as a "feature phone" as shown, for example, as telephone 802 of FIG. 8, which includes interface 811, processor 813, display 815, memory 817 and keypad 819, which may be similar to and provide the same functionality as the corresponding elements of the adjunct box 105. However, each of the elements 811–819 may also perform other telephone functions.

For example, the keypad 819 may function as both a telephone keypad and as a keypad for providing input for managing Caller ID. Similarly, the memory 811 may store Caller ID data and may also store additional information, such as speed dial information or answering machine information, such as outgoing or incoming messages. Also, the processor 813 may be adapted to perform control functions for the telephone as well as for the Caller ID portion thereof. Telephone 802 also includes conventional telephone functionality 820 for use in performing conventional telephone functions.

Based on an understanding of these various embodiments, one of skill in the art is likely to conceive of alternative embodiments that are not specifically enumerated here, but that are clearly within the scope of the invention.

What is claimed is:

1. A caller ID module, comprising:

scrolling memory for storing a plurality of entries of Caller ID data relating to a respective plurality of callers, said scrolling memory being adapted to allow a user to scroll through said plurality of entries of Caller ID data; and a call related information deletion module, for prematurely deleting at least a portion of at least one of said plurality of entries of Caller ID data from said scrolling memory based on a determination that said at least one entry contains unmeaningful Caller ID data, said premature deletion relating to deletion before deletion of meaningful Caller ID data received before said unmeaningful Caller ID data.

2. A caller ID module according to claim 1, wherein:

said unmeaningful Caller ID data relates to a blocked status of the related meaningful Caller ID data.

3. A caller ID module according to claim 1, wherein:

said at least a portion of said at least one of said plurality of entries of Caller ID data is a portion indicating that meaningful Caller ID data was blocked.

4. A caller ID module according to claim 1, wherein:

said call related information deletion module operates in response to user input.

5. A caller ID module according to claim 1, wherein:

said call related information deletion module operates automatically at a predetermined time.

6. A caller ID module according to claim 1, wherein:

said predetermined time is in relation to a time at which said caller ID data was received.

7. A method of managing caller ID memory in a caller ID module of customer premises equipment, comprising:

receiving unmeaningful caller ID data relating to a caller; and deleting, from said caller ID module of said customer premises equipment, at least a portion of said unmeaningful caller ID data before deletion of meaningful Caller ID data received before said unmeaningful caller ID data.

8. The method of managing caller ID memory in a caller ID module according to claim 7, wherein:

said unmeaningful caller ID data is a BLOCKED status of said caller.

9. The method of managing caller ID memory in a caller ID module according to claim 7, wherein:

said unmeaningful caller ID data is an OUT OF AREA status of said caller.

10. The method of managing caller ID memory in a caller ID module according to claim 7, wherein:

said unmeaningful caller ID data is an UNAVAILABLE status of said caller.

11. Apparatus for managing caller ID memory in a caller ID module of customer premises equipment, comprising:

means for receiving unmeaningful caller ID data relating to a caller; and means for deleting, from said caller ID module of customer premises equipment, at least a portion of said unmeaningful caller ID data before deletion of meaningful Caller ID data received before said unmeaningful caller ID data.

12. The apparatus for managing caller ID memory in a caller ID module according to claim 11, wherein:

said unmeaningful caller ID data is a BLOCKED status of said caller.

13. The apparatus for managing caller ID memory in a caller ID module according to claim 11, wherein:

said unmeaningful caller ID data is an OUT OF AREA status of said caller.

14. The apparatus for managing caller ID memory in a caller ID module according to claim 11, wherein:

said unmeaningful caller ID data is an UNAVAILABLE status of said caller.

* * * * *